G. W. JESSUP.
VINE CUTTING MECHANISM FOR SWEET POTATO DIGGERS.
APPLICATION FILED DEC. 16, 1915.

1,188,788.

Patented June 27, 1916.

Inventor:
George W. Jessup

By
Attorney

THE COLUMBIA PLANOGRAPH CO., WASHINGTON, D. C.

UNITED STATES PATENT OFFICE.

GEORGE W. JESSUP, OF MOORESTOWN, NEW JERSEY.

VINE-CUTTING MECHANISM FOR SWEET-POTATO DIGGERS.

1,188,788. Specification of Letters Patent. Patented June 27, 1916.

Application filed December 16, 1915. Serial No. 67,098.

*To all whom it may concern:*

Be it known that I, GEORGE W. JESSUP, a citizen of the United States, residing at Moorestown, in the county of Burlington and State of New Jersey, have invented certain new and useful Improvements in Vine-Cutting Mechanism for Sweet-Potato Diggers, of which the following is a specification.

The object of my invention is to provide a vine cutting mechanism for sweet potato diggers, of novel, simple and efficient construction having provision whereby the vines may be raised from the ground and cut in advance of the plow of the digger, and whereby my improved mechanism may be adjusted as desired relatively to the plow.

My invention consists in the novel construction and combinations of parts hereinafter fully described and claimed.

Figure 1:
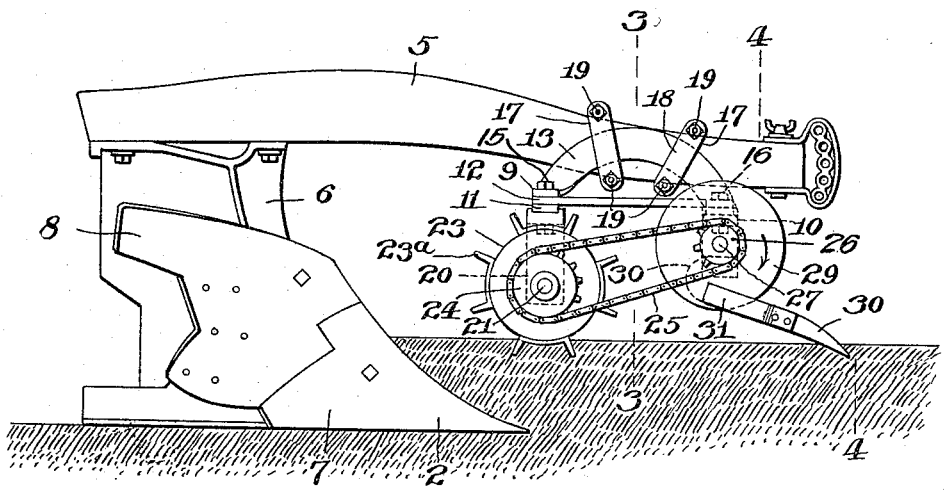
Figure 3:
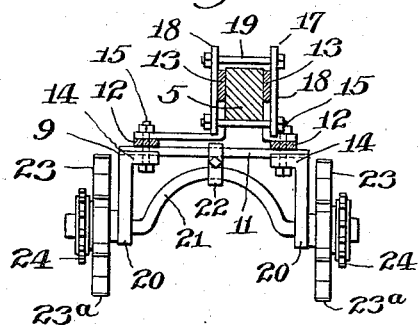
Figure 2:
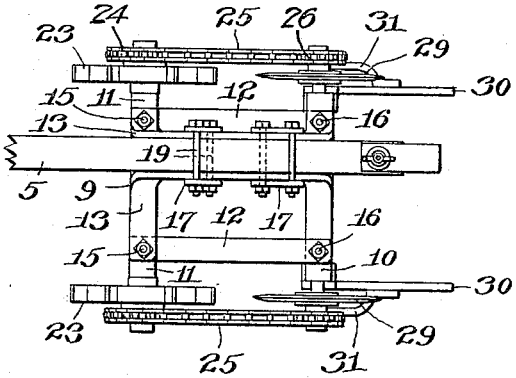
Figure 4:
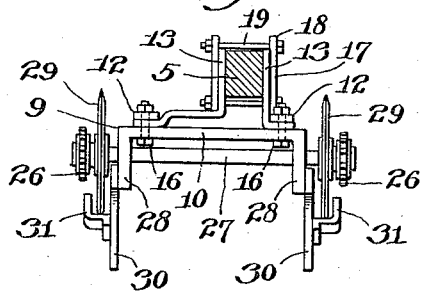

In the accompanying drawings, illustrating my invention: Figure 1 is a side elevation of a sweet potato digger provided with my improved vine cutting mechanism. Fig. 2 is a plan of the forward portion thereof. Fig. 3 is a transverse section, on line 3—3 of Fig. 1. Fig. 4 is a transverse section, on line 4—4 of Fig. 1.

Referring to the drawings, the potato digger there illustrated comprises a plow 2 having a forwardly extending beam 5, the plow 2 including the plow frame 6 to which the beam 5 is secured, the plowshare 7 and the mold-board 8.

The construction and operation of the plow digger are well known and, therefore, I shall not describe them in detail herein.

Arranged beneath the forward portion of the plow beam 5 is a frame structure 9, comprising, as generally stated, two bars 10 and 11 extending transversely beneath the beam 5, two longitudinally extending bars 12 connecting the outer portions of the bars 10 and 11, and two members 13 connecting the bars 10 and 11 and arranged adjacent to the respective sides of the plow beam 5. The ends of the bar 11 are seated in grooves in blocks 14 and the bar 11 and blocks 14 are secured together by bolts 15 extending vertically therethrough. The bolts 15 also extend through and secure the rearward ends of the bars 12 and the downwardly and outwardly extending rearward end portions of the members 13 to the bar 11, the arms of the members 13 having holes or slots therein larger than the diameter of the bolts 15, permitting the members 13 to be adjusted toward and from the beam 5. The outwardly extending forward end portions of the members 13 are seated on the bar 10 and are secured thereto by bolts 16 extending vertically therethrough. The bolts 16 also extend through the forward ends of the bars 12 and secure them to the bar 10. The openings in the forward end portions of the members 13 through which the bolts 16 extend are larger than the diameter of the bolts, permitting the members 13 to be adjusted toward and from the beam 5. The body portions of the members 13 are arched and are arranged against the respective sides of the plow beam 5, as shown. The arched portions of the members 13 are secured to the plow beam 5 by suitable clamps 17 which surround the members 13 and beam 5 and each of which comprises a pair of plates 18 and a pair of bolts 19 connecting the plates 18. By loosening the bolts 19 the arched portions of the members 13 may be adjusted through the clamps 17 to raise or lower the forward or rearward end of the frame 9 without materially changing the position of the frame longitudinally of the plow beam 5, for a purpose hereinafter explained.

The blocks 14 of the frame 9 are provided with downwardly extending arms 20, and extending through and between the arms 20 is a shaft 21 having its central portion arched, as shown, and secured to the frame bar 11 by a suitable clamp 22 which prevents the shaft 21 from turning. The ends of the shaft 21 extend outwardly from the arms 20. These outwardly extending ends of the shaft 21 carry two wheels 23 which are mounted to turn freely thereon, indepently of each other. The wheels 23 are adapted to run upon the ground during the forward movement of the plow, and they are provided with radially projecting spuds 24 which enter the ground and insure the turning of the wheels as the plow is drawn forward. Each wheel 23 has a sprocket wheel 24 secured to the outer side thereof. The two sprocket wheels 24 are connected by forwardly extending driving chains 25 to two sprocket wheels 26 fixed on the respective ends of a shaft 27 which extends beneath the bar 10 and which is mounted to turn in bearings formed in arms 28 which extend downwardly from the respective ends of the bar 10. This shaft 27 has two circular cutters 29 secured thereto outwardly of and adjacent to the arms 28.

Secured to the outer side of each arm 28 between it and the adjacent cutter 29 is a forwardly and downwardly extending vine raising member 30. This member 30 extends some distance in advance of the cutter 29 and it is adapted to pass directly over the top of the ground or to plow through the same, and thus pass under the potato vines which rest upon the ground and raise and direct them to the cutter 29, during the forward movement of the digger. Each member 30 is bifurcated between the main body thereof and a part or bracket 31 which is secured thereto and forms, in effect, a part thereof. This bifurcated portion of each member 30 embraces the lower forward portion of the cutting edge of its adjacent cutter 29 and thus forms a support for the vines on each side of each cutter, and upon which the vines are pressed by the cutters as the forward portions thereof move downwardly during the cutting operation.

The operation of my improved mechanism is as follows: The frame 9 is first adjusted and secured to the plow beam 5 by means of the clamps 17 in such position that the spuds on the driving wheels 23 will enter the ground, and that the forward ends of the vine raising members 30 will pass directly over the surface of the ground or plow through the same a slight distance below the surface, during the forward movement of the digger. This adjustment of the frame 9 may be done by first loosening the clamps 17 and then raising or lowering the shafts 21 and 27 relatively to each other and then tightening the clamps 17. The novel arched construction of the members 13 permits this to be done without shifting the position of the shafts 21 and 27 longitudinally of the plow. After the frame 9 has been properly adjusted and secured to the plow beam 5, the digger or plow 2 is drawn through the ground, the plow following the row of potato vines and plowing up the potatoes in the usual manner. As the digger is thus drawn forward, the cutters 29 and members 30 pass along the row of vines on the respective sides of the portions of the vines that are connected to or project from the ground; and the members 30 pass under the mass of vines which spread laterally from the row, and raise the two sides of the mass of vines and direct them over the top of the members 30 to the cutters 29. The cutters 29 being rotated in the direction of the arrow by the engagement of the wheels 23 with the ground, as the digger is drawn forward, cut the vines, as the cutters 29 tend to press the vines down upon the members 30, thus cutting from the main body of the row of vines all portions thereof which extend outwardly from the row beyond the cutters, leaving only a narrow strip of vines connected to the ground which is being plowed up, thus facilitating the digging operation. The provision of the two driving wheels 23 or the double driving mechanism insures the rotation of the cutter shaft 27 at all times even though both of the driving wheels 23 are not engaged with the ground at all times due to the uneven surface thereof.

I claim:

1. The combination of a plow having a forwardly extending beam, a frame structure adjustably secured to said beam, a cutter rotatably supported by said structure, and a ground-engaging driving wheel rotatably supported by said structure and operatively connected to said cutter, the axes of said cutter and said wheel being held in fixed relative positions by said structure.

2. The combination of a plow having a forwardly extending beam, a frame structure having an arched member arranged adjacent to said beam, a clamping device engaging said member and adjustably securing it to said beam, a cutter carried by the forward portion of said structure, and a ground-engaging driving wheel carried by the rearward portion of said structure and operatively connected to said cutter, the axes of said cutter and said wheel being held in fixed relative positions by said structure.

3. The combination of a plow having a forwardly extending beam, a frame structure adjustably secured to said beam, a cutter rotatably supported by said structure, a ground-engaging driving wheel rotatably supported by said structure and operatively connected to said cutter, the axes of said cutter and said wheel being held in fixed relative positions by said structure, and a vine raising member secured to said structure adjacent to the cutter and extending forwardly and downwardly therefrom.

4. The combination of a plow having a forwardly extending beam, a frame structure having an arched member arranged adjacent to said beam, a clamping device engaging said member and adjustably securing it to said beam, a cutter carried by the forward portion of said structure, a ground-engaging driving wheel carried by the rearward portion of said structure and operatively connected to said cutter, the axes of said cutter and said wheel being held in fixed relative positions by said structure, and a vine raising member secured to said structure adjacent to the cutter and extending forwardly and downwardly therefrom.

5. The combination of a plow having a forwardly extending beam, a bar extending transversely beneath the plow beam and having downwardly extending end portions, means to secure said bar to the plow beam, a shaft extending between said end portions and journaled therein, means to actuate said shaft during the forward movement of the plow, cutters secured to said shaft, and vine raising members secured to said end portions adjacent to said cutters and extending forwardly and downwardly therefrom.

6. The combination of a plow having a forwardly extending beam, a bar extending transversely beneath the plow beam and having downwardly extending end portions, means to secure said bar to the plow beam, a shaft extending between said end portions and journaled therein, means to actuate said shaft during the forward movement of the plow, cutters secured to said shaft, and vine raising members secured to said end portions adjacent to said cutters and extending forwardly and downwardly therefrom, said members having bifurcated portions embracing said cutters.

7. The combination of a plow having a forwardly extending beam, a frame structure extending transversely beneath the plow beam and having two upwardly extending arched members arranged adjacent to the respective sides of the plow beam, clamps surrounding said members and said beam, a cutter carried by the forward portion of said structure, and a driving wheel carried by the rearward portion of said structure and operatively connected to said cutter.

8. The combination of a plow having a forwardly extending beam, a frame structure extending transversely beneath the plow beam and having two upwardly extending arched members arranged adjacent to the respective sides of the plow beam, clamps surrounding said members and said beam, a cutter carried by the forward portion of said structure, a driving wheel carried by the rearward portion of said structure and operatively connected to said cutter, and a vine raising member secured to said structure adjacent to the cutter and extending forwardly and downwardly therefrom.

9. The combination of a plow having a forwardly extending beam, a frame structure secured to said beam, a shaft rotatably supported by the forward portion of said structure, a pair of cutters secured to said shaft, a pair of sprocket wheels secured to said shaft, a pair of driving wheels rotatably supported by the rearward portion of said structure, each driving wheel having a sprocket wheel secured thereto and each driving wheel being rotatable independently of the other, and sprocket chains connecting the sprocket wheels on the shaft with the sprocket wheels on the driving wheels.

In testimony whereof I affix my signature hereto.

GEORGE W. JESSUP.

Copies of this patent may be obtained for five cents each, by addressing the "Commissioner of Patents. Washington, D. C."